A. J. COOK.
Harvester.
No. 167,387.
2 Sheets--Sheet 2.
Patented Sept. 7, 1875.
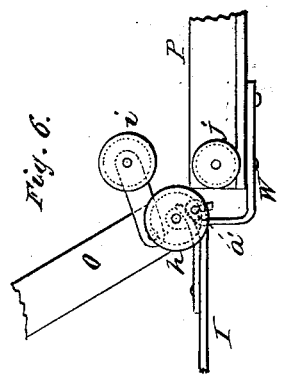
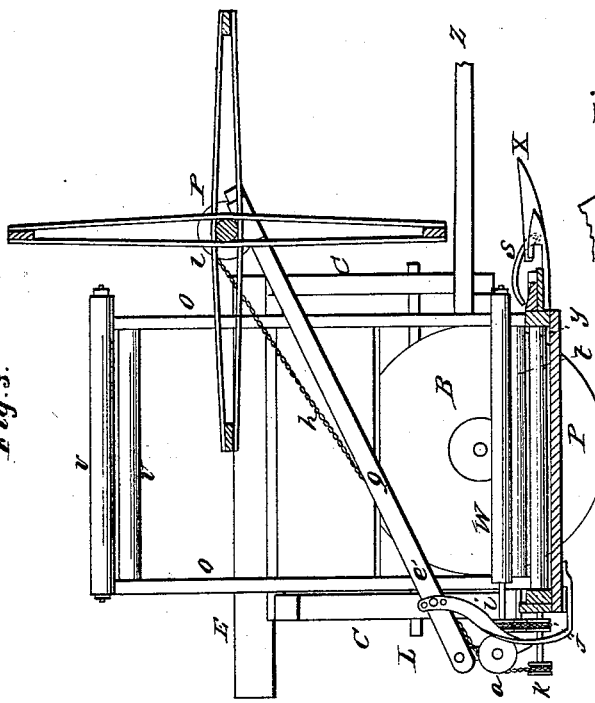
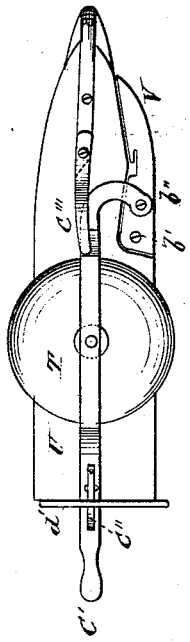
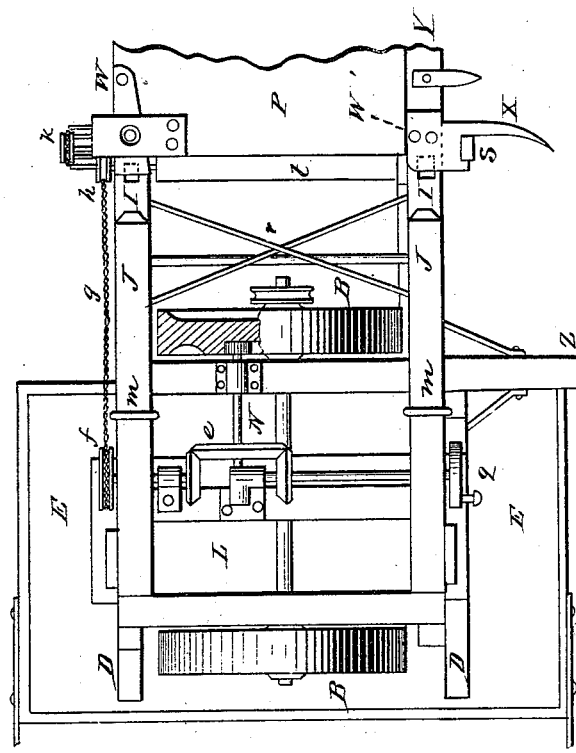
Witnesses:
C. H. Watson
H. C. Scott.
Inventor:
Andrew J. Cook
per
West & Bond
Attorneys

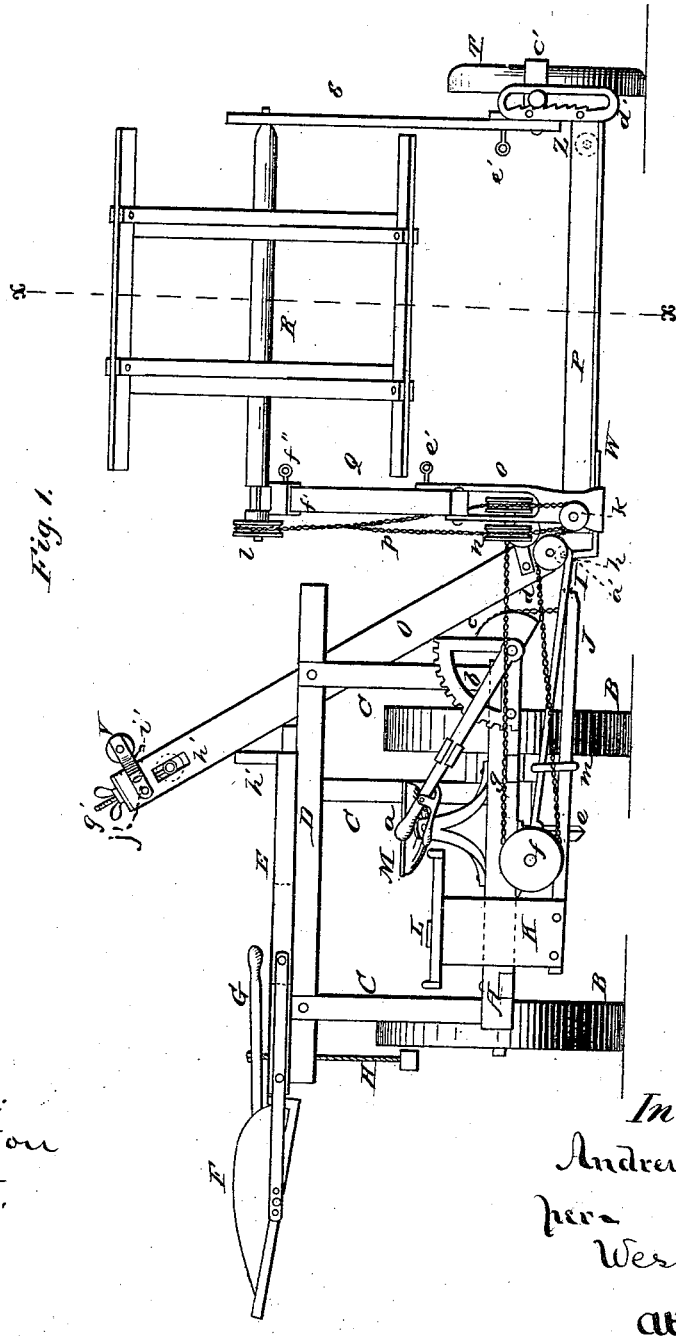

UNITED STATES PATENT OFFICE.

ANDREW J. COOK, OF WICHITA, KANSAS, ASSIGNOR OF ONE-FOURTH HIS RIGHT TO RALPH EMERSON AND WM. A. TALCOTT, OF ROCKFORD, ILL.

IMPROVEMENT IN HARVESTERS.

Specification forming part of Letters Patent No. 167,387, dated September 7, 1875; application filed February 17, 1875.

*To all whom it may concern:*

Be it known that I, ANDREW J. COOK, of Wichita, in the county of Sedgwick and State of Kansas, have invented certain new and useful Improvements in Combined Harvester and Mower; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1 is a rear elevation or view; Fig. 2, a bottom view, with the dumping-tray removed, and the carrier-frame partly broken off; Fig. 3, a cross-section on line $x\ x$ of Fig. 1; Fig. 4, an end view of the grain side or of the carrier-frame; Fig. 5, a detail, showing the mode of hinging the carrier-frame to the main frame; and Fig. 6, a detail, showing the mode of hinging the elevator-frame to the carrier-frame.

The object of my invention is to make a combined harvesting and mowing machine which can be readily and easily changed and adapted to either use or purpose, and to so combine them as to retain in the mowing-machine a flexible or floating finger-bar; also, to improve several of the parts and combinations of parts, as hereinafter set forth, and claimed as new.

In the drawings, A represents the main frame; B B, the drive-wheels; C, posts; and D, upper cross-bars of the frame supporting the grain-receiver. E represents the grain-receiver and binder's table; F, a dumping-tray or sheaf-gatherer; G, its handle; and H, a weight for returning it into position when the sheaves have been discharged from it; I I, hinged bars for connecting the sickle-bar and carrier-frame with the frame A; J J, adjustable bars for supporting the binder's stand; K, uprights for sustaining the binder's stand above the main frame A; L, binder's stand; M, seat for driver when the machine is reduced to a mower; N, shaft of pinion-wheel, through which power is transmitted to the gear-wheels; O, elevator-frame; P, platform-frame; Q S, inclined reel-supports; R, reel; T, grain-wheel; U, grain board or frame; V, an ordinary grass-shoe, permanently attached to the end of the cutter-bar; W W′, brackets, by which the carrier-frame and sickle are hinged to the bars I I; X, inner shoe of the cutter-bar; Y, cutter-bar; $a$, lever, provided with a spring-pawl; $b$, segmental ratchet; $c$, segments, over which the chains $d$ pass, which chains are connected with the hinged bars I I, and by means of which, and of the segments $c$ and lever $a$, the inner end of the carrier-frame and the elevator-frame can be raised or lowered, or adjusted on the ratchet $b$; $e$, bevel-gear wheel on pinion-shaft N, by means of which the shaft carrying the pinion $f$ and the shaft carrying the wheel or crank $q$, are operated.

As the sickle requires a greater speed than the carrier and elevator, I prefer to carry the pinion which drives the pulley $f$ in much nearer the center of the bevel-wheel $e$ than the wheel which drives the crank-wheel $q$, which latter wheel should be at the extreme, as shown. The difference in speed can, however, be obtained, making the beveled pinions of different diameters, and locating both as shown at Fig. 2.

$r$ represents two braces connecting the hinged bars I together, to give them the necessary steadiness and resistance to the standing grain or grass. $s$ is a cover, hinged to the inner shoe X, and lies over the joint or hinge by which the cutter-bar is attached to the front hinged bar I, and also over the sickle-bar and pitman connection, to keep the dirt out of the joints or hinges, and to prevent the entanglement or interruption of the grain in its movements. $t\ u$ are shafts or rollers, upon which the lower canvas of the elevator is placed. $v\ w$ are the shafts or rollers upon which the upper canvas or belting is placed.

This upper part of the elevator, which forms its cover, and beneath which the grain passes, may be made of canvas; but I prefer to make it of four belts connected together by cross-slats, which will give a more positive movement to the ascending grain.

$y\ z$ are shafts or rollers upon which the carrier canvas is placed. The canvas of the carrier and the canvas or belting of the elevator are made in width equal, or nearly equal, to the length of their rollers, so that, as will be seen, the cover or upper canvas or belting of the elevator will extend farther to the front of the machine than the lower, as shown at Fig. 3, which will prevent the grain from falling over, and keep the butts from lagging behind. $a'$ is the pivotal bolt of the hinge, connecting the rear hinged bar I with the carrier-frame P. $b'$ and $b''$ are bolts connecting the dividing-board U or grain-wheel frame with the shoe V. The grain-wheel T has its bearing in the lever $c'$, which is opened in the middle, or made of two bars for that purpose. The lever $c'$ is pivoted to the shoe V at the bolt $b''$, and its rear end is supported by the ratchet $d'$, and held in place by the spring $c''$. $c'''$ is a bar or spring, with its rear end turned outward to bend the standing grain over out of the way of the grain-wheel. $e'$ are bolts or pins for adjusting the position of the reel-supports, and thereby raising or lowering the reel. $f'$ is a sliding collar or cap, on the upper end of the inner reel-support, and is provided with a bearing for the reel-shaft. The support Q is provided with a series of holes for the pin $f''$, so that the line of the reel-shaft can be adjusted, and so that the cap $f'$ may be used also as a band-tightener. $g'$ is a thumb-screw or thumb-nut on a bolt connected with the sliding bearings $h'$ of the roller $u$ in each of the bars O, for the purpose of tightening the lower elevating canvas. The bars or brackets which support the roller $v$ are pivoted at $i'$, and provided with set-pins $j'$, so that the upper roller $v$ can be moved in an arc, and the upper canvas not only be tightened, but also so that its upper end can be brought down to or be raised from the lower elevating canvas, and thereby adjust a double elevator to light or heavy grain. $f$, $h$, $i$, $j$, $k$, and $l$ are pulley-wheels. The chain or belt $g$ passes from the pulley or sprocket wheel $f$ over the pulley $i$, (see Fig. 6,) under the pulley $j$, thence over the pulley $h$ to pulley or wheel $f$. The pulleys $j$ and $k$ are both on the same shaft, Y. $j$ operates as a driving-pulley for $k$ and the chain or belt $p$. The chain or belt $p$ passes around the wheels $k$ and $l$, and over the anti-friction rollers $n$ $o$, which are arranged with reference to pivots of the reel-support Q, so as to keep the belt or chain taut when the reel is raised or lowered.

When chains are used the wheels will be ordinary sprocket-wheels. The wheel $h$ drives the shaft which operates the lower elevating-canvas, the wheel $i$ the shaft which operates the upper part of the elevator, and the wheel $j$ the carrier. Gear-wheels can be used by connecting the wheels $f$ and $h$ with a shaft provided with suitable connecting-gearing. The main frame, as will be seen, is mounted upon two driving-wheels, B, which are attached to a revolving axle provided with suitable clutches and levers for throwing the moving parts out of gear, so that the machine can be backed or turned, and so that it can be drawn along, without operating the sickle and other moving parts thereof. The bars I, to which the cutter-bar and carrier frame are attached, are hinged at their outer ends to, or around, the journal-boxing of the cross-shafts, as shown at Fig. 5, and at their inner ends to the brackets W W', and the lower end of the elevator-frame O is pivoted to the same brackets, so that the inner end of the carrier and the elevator may rise and fall freely, except as the movement is limited by the chains $d$—of which there are two, one on each side—and thereby permit either wheel B to pass over obstructions or depressions without interfering with the proper operation of its parts, or straining the machine. The lower end of the frame O may be pivoted to the carrier-frame P at its inner end instead of the brackets, if desired, the essential point being that the elevator shall so rise and fall with the carrier that the flow or passage of the cut grain to the receiver shall not be checked or interrupted by any movement or relative change of position between the carrier and elevator. I have so arranged the binders' stand that notwithstanding the mounting of the binders between the two driving-wheels, their weight partly counterbalances the weight of the jointed carrier and its frame. I accomplish this by hanging the bars J in stirrups or links $m$, which, as shown, are passed over the hinged bars I; but they can as well be passed over the bars or main frame A. These stirrups act as fulcra, and cause the bars J to operate as levers and transfer the weight of the binders on the stand L to the hinged bars I. (See Fig. 1.) The stirrups $m$ may be moved toward or from the supports K of the binders' stand, which are secured to the outer ends of the bars or levers J. By transferring a part of the weight of the binders to the bars I, near to their inner joints, I give increased steadiness also to the machine. The binders' table and grain-receiver E is provided with suitable holes or openings over the stand L to permit the binders to do their work with ease and facility, and the back of this table is provided with a board, $h^1$, to prevent the grain from falling over, and also to prevent it from being forced over by the elevator when any considerable quantity has been deposited on the table. The sheaves, when bound, are thrown into the gatherer F or onto the ground, as this gatherer may be used with the machine or not, as may be desired.

When used as a harvester a second seat is provided for the driver, and it is placed on the inner front corner of the table E, directly over the draft-pole Z.

The reel-supports Q and S are both supsupported from behind the canvas, and are attached to the rear side of the carrier-frame. By this mode of attaching them to the machine the vibration of the reel does not seriously affect the chain or belt $p$, and I avoid posts at either end of the reel, which, when placed in front of a harvester, are in the way of the carrier or elevator, and are liable to affect the movement of the grain, and in a combined machine it enables me to unship the harvesting attachments without unhanging or disturbing the reel.

To change the machine from a harvester to a mower I have only to draw the bolts $b'$ $b''$, Fig. 4, and the bolt $a'$ from the hinge of the bracket W, when the carrier and reel, with its supports, are disconnected and fall to the ground with the elevator attached. The stand L is then lifted from the supports K, when the bars or levers J can be drawn out back. The table is attached to the bars D by four screws or bolts, which are easily withdrawn, when the table, with its dumping-tray, if used, come off, and the machine is ready for mowing by releasing the lever $a$ and letting the sickle-bar down onto the ground, where it has the easy floating movement necessary for a good mower. The braces $r$ hold the hinged bars and the cutter steadily in line, so that it cuts steadily and freely.

In order to change the speed of the sickle a changeable gear or a smaller pinion for driving the sickle may be used.

In the system of belting shown it will be observed that the strain of the pulley $i$, which drives the upper elevator-canvas, is against the hinged frame O, which strain keeps the elevator-frame pressing against the table E or its back projection $h'$, so that the movements of the machine do not cause any separation between the elevator and the receiving-table E.

What I claim as new, and desire to secure by Letters Patent, is—

1. The combination of the hinged bars I I with the segments $c$, chains $d$, rack $b$, and lever $a$, for raising, lowering, and holding the inner ends of the cutter-bar and carrier-frame P, substantially as specified.

2. The combination of the bars or levers J with the hinged bars I, stirrups $m$, and binders' stand, with its supports K, substantially as described.

3. The coupling-frame, consisting of the hinged bars I and cross-braces $r$, substantially as set forth.

4. The combination of the pulleys or wheels $h$ $i$ $j$ with the belt or chain $g$, arranged as described, whereby the elevator is held against the table E, substantially as specified.

In testimony that I claim the foregoing as my own I affix my signature in presence of two witnesses.

ANDREW J. COOK.

Witnesses:
C. H. WATSON,
L. L. BOND.